United States Patent
Klavuhn et al.

(10) Patent No.: US 9,709,756 B2
(45) Date of Patent: Jul. 18, 2017

(54) PRECONNECTORIZED CABLE ASSEMBLIES FOR INDOOR/OUTDOOR APPLICATIONS

(71) Applicant: CORNING OPTICAL COMMUNICATIONS LLC, Hickory, NC (US)

(72) Inventors: Tory Allen Klavuhn, Newton, NC (US); Bao Duy Nguyen, Charlotte, NC (US); Lars Kristian Nielsen, Hickory, NC (US); Hieu Vinh Tran, Charlotte, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 291 days.

(21) Appl. No.: 14/177,674

(22) Filed: Feb. 11, 2014

(65) Prior Publication Data

US 2014/0161395 A1  Jun. 12, 2014

Related U.S. Application Data

(63) Continuation of application No. PCT/US2012/051041, filed on Aug. 16, 2012.
(Continued)

(51) Int. Cl.
*G02B 6/38* (2006.01)
*G02B 6/44* (2006.01)

(52) U.S. Cl.
CPC .......... *G02B 6/3887* (2013.01); *G02B 6/3821* (2013.01); *G02B 6/3869* (2013.01); *G02B 6/4435* (2013.01)

(58) Field of Classification Search
None
See application file for complete search history.

(56) References Cited

U.S. PATENT DOCUMENTS 5,807,026 A * 9/1998 Valette ................. G02B 6/4465
254/134.5
6,546,175 B1  4/2003 Wagman et al. .............. 385/113
(Continued)

FOREIGN PATENT DOCUMENTS

CN  101248382 A  8/2008 ............... G02B 6/44
CN  101533137 A  9/2009 ............... G02B 6/44
(Continued)

OTHER PUBLICATIONS

US 7,481,586, 01/2009, Lu et al. (withdrawn)
(Continued)

*Primary Examiner* — Sung Pak
*Assistant Examiner* — Hoang Tran
(74) *Attorney, Agent, or Firm* — Michael E. Carroll, Jr.

(57) ABSTRACT

Fiber optic cable assemblies having a preconnectorized hardened connector on at least one end of a fiber optic cable that includes a subunit cable surrounded by an upjacketed portion having strength components and method for making are disclosed. The subunit cable has the optical fiber and a plurality of tensile yarns disposed within a subunit jacket. The hardened connector is attached to the optical fiber at a first end and strain-relieves at least some of the plurality of tensile yarns and the strength components. The cable assembly may also include a non-hardened connector on the second end of the optical fiber along with an optional pulling grip.

19 Claims, 17 Drawing Sheets

Related U.S. Application Data

(60) Provisional application No. 61/524,151, filed on Aug. 16, 2011.

(56) References Cited

U.S. PATENT DOCUMENTS

| | | | |
|---|---|---|---|
| 6,648,520 B2 | 11/2003 | McDonald et al. | 385/78 |
| 6,785,450 B2 | 8/2004 | Wagman et al. | 385/100 |
| 6,899,467 B2 | 5/2005 | McDonald et al. | 385/78 |
| 7,090,406 B2 | 8/2006 | Melton et al. | |
| 7,090,407 B2 | 8/2006 | Melton et al. | 385/62 |
| 7,111,990 B2 | 9/2006 | Melton et al. | |
| 7,113,679 B2 | 9/2006 | Melton et al. | 385/113 |
| 7,137,742 B2 | 11/2006 | Theuerkorn et al. | |
| 7,244,066 B2 | 7/2007 | Theuerkorn | |
| 7,264,402 B2 | 9/2007 | Theuerkorn et al. | |
| 7,303,418 B2 | 12/2007 | O'Connor | |
| 7,325,980 B2 | 2/2008 | Pepe | |
| 7,338,214 B1 | 3/2008 | Gurreri et al. | |
| 7,467,896 B2 | 12/2008 | Melton et al. | 385/87 |
| 7,556,437 B2 | 7/2009 | Droege | |
| 7,568,844 B2 | 8/2009 | Luther et al. | |
| 7,572,065 B2 | 8/2009 | Lu et al. | |
| 7,591,595 B2 | 9/2009 | Lu et al. | |
| 7,609,925 B2 | 10/2009 | Gronvall et al. | 385/100 |
| 7,614,797 B2 | 11/2009 | Lu et al. | |
| 7,654,747 B2 | 2/2010 | Theuerkorn et al. | |
| 7,677,814 B2 | 3/2010 | Lu et al. | |
| 7,686,519 B2 | 3/2010 | Lu | |
| 7,722,258 B2 | 5/2010 | Lu et al. | |
| 7,744,286 B2 | 6/2010 | Lu et al. | |
| 7,744,288 B2 | 6/2010 | Lu et al. | |
| 7,762,726 B2 | 7/2010 | Lu et al. | |
| 7,785,015 B2 | 8/2010 | Melton et al. | 385/59 |
| 7,785,019 B2 | 8/2010 | Lewallen et al. | |
| 7,794,155 B1 | 9/2010 | Haley et al. | |
| 7,837,396 B2 | 11/2010 | Marcouiller | |
| 7,881,576 B2 | 2/2011 | Melton et al. | 385/103 |
| 7,918,609 B2 | 4/2011 | Melton et al. | 385/59 |
| 7,942,590 B2 | 5/2011 | Lu et al. | |
| 7,959,361 B2 | 6/2011 | Lu et al. | |
| RE42,522 E | 7/2011 | Zimmel et al. | |
| 7,972,067 B2 | 7/2011 | Haley et al. | |
| 8,038,356 B2 | 10/2011 | Marcouiller et al. | |
| 8,128,294 B2 | 3/2012 | Lu et al. | |
| 8,137,002 B2 | 3/2012 | Lu et al. | |
| 8,170,391 B2 | 5/2012 | Beck | |
| 8,272,792 B2 | 9/2012 | Coleman et al. | |
| 8,285,096 B2 | 10/2012 | Coleman et al. | |
| 8,303,193 B2 | 11/2012 | Coleman et al. | |
| 8,506,173 B2 | 8/2013 | Lewallen et al. | |
| 8,523,455 B2 | 9/2013 | Luther et al. | |
| 8,556,520 B2 | 10/2013 | Elenbaas et al. | |
| 2004/0223720 A1* | 11/2004 | Melton | G02B 6/3869 385/147 |
| 2006/0045428 A1 | 3/2006 | Theuerkorn et al. | |
| 2008/0253729 A1 | 10/2008 | Gronvall et al. | 385/137 |
| 2010/0239216 A1 | 9/2010 | Paschal et al. | 385/113 |
| 2010/0322584 A1 | 12/2010 | Kowalczyk et al. | 385/136 |
| 2011/0013871 A1 | 1/2011 | Lu et al. | |
| 2011/0150398 A1 | 6/2011 | Zimmel et al. | |
| 2011/0150403 A1 | 6/2011 | Kachmar et al. | 385/103 |
| 2011/0189876 A1 | 8/2011 | Schneider | |

FOREIGN PATENT DOCUMENTS

| | | | |
|---|---|---|---|
| DE | 102010039715 B9 | 8/2012 | |
| WO | WO2010051334 A1 | 5/2010 | G02B 6/44 |
| WO | WO2013/025855 A1 | 2/2013 | G02B 6/36 |
| WO | 2013179376 A1 | 5/2013 | |

OTHER PUBLICATIONS

Chinese Search Report, Application No. 2012800399063, Jan. 29, 2015, 2 pages.

European Search Report, Application No. 12823528.0, Feb. 19, 2015, 6 pages.

International Search Report and Written Opinion issued in corresponding PCT Application No. PCT/US2012/051041, dated Oct. 26, 2012.

Patent Examination Report issued in corresponding AU Application No. 2012296501, dated Nov. 21, 2014.

Communication issued in corresponding EP Application No. 12823528.0, dated Jun. 10, 2015.

* cited by examiner

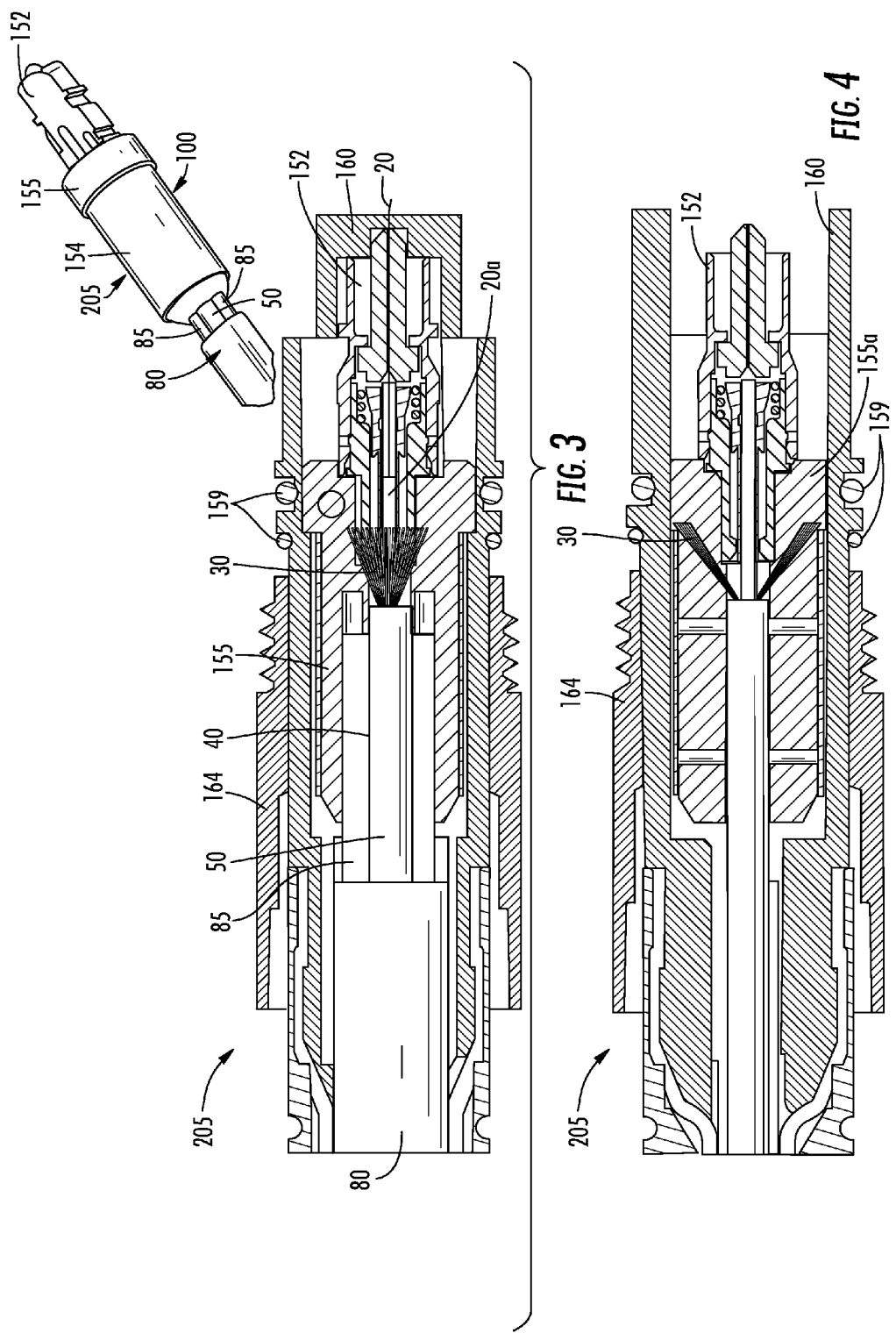

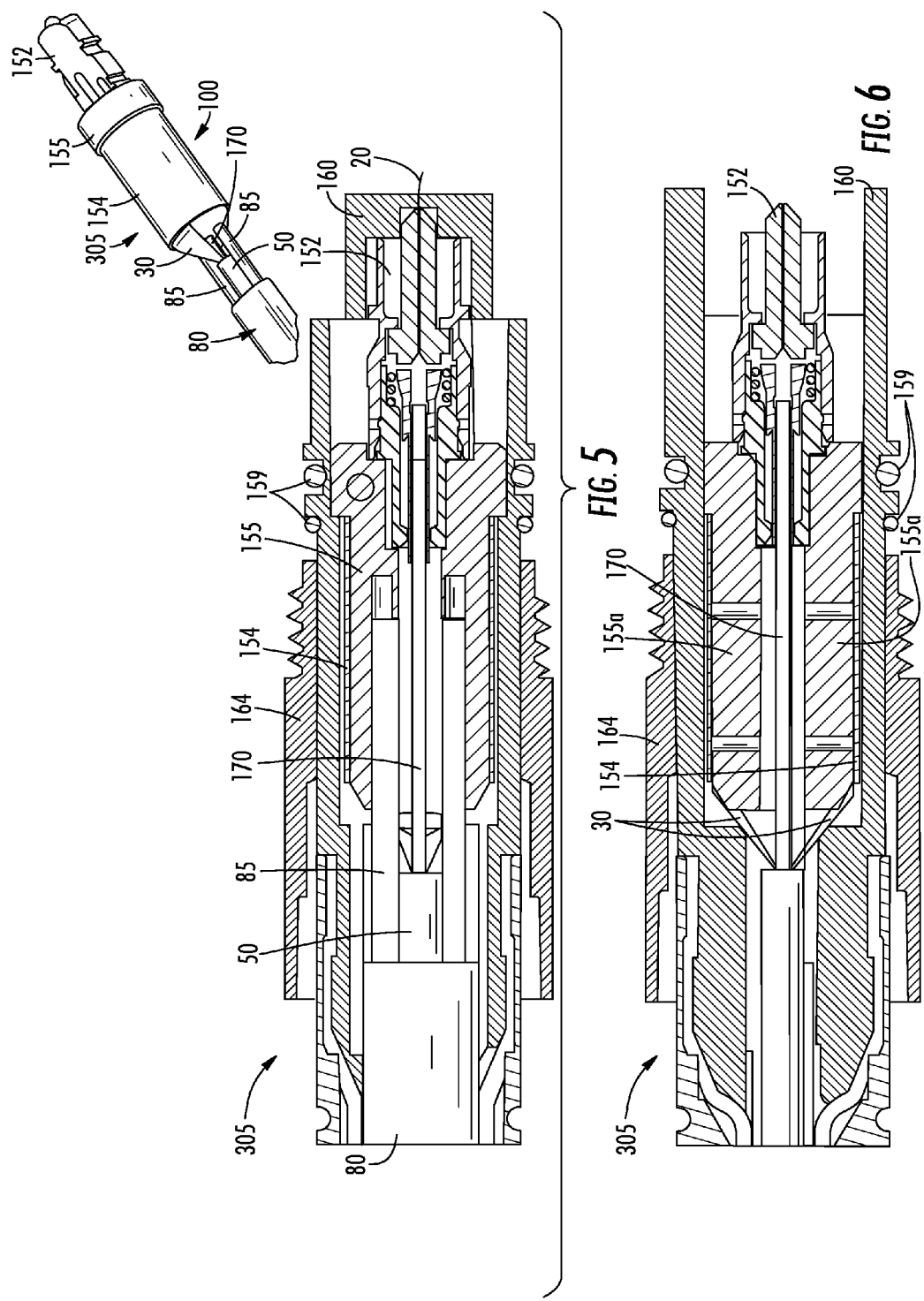

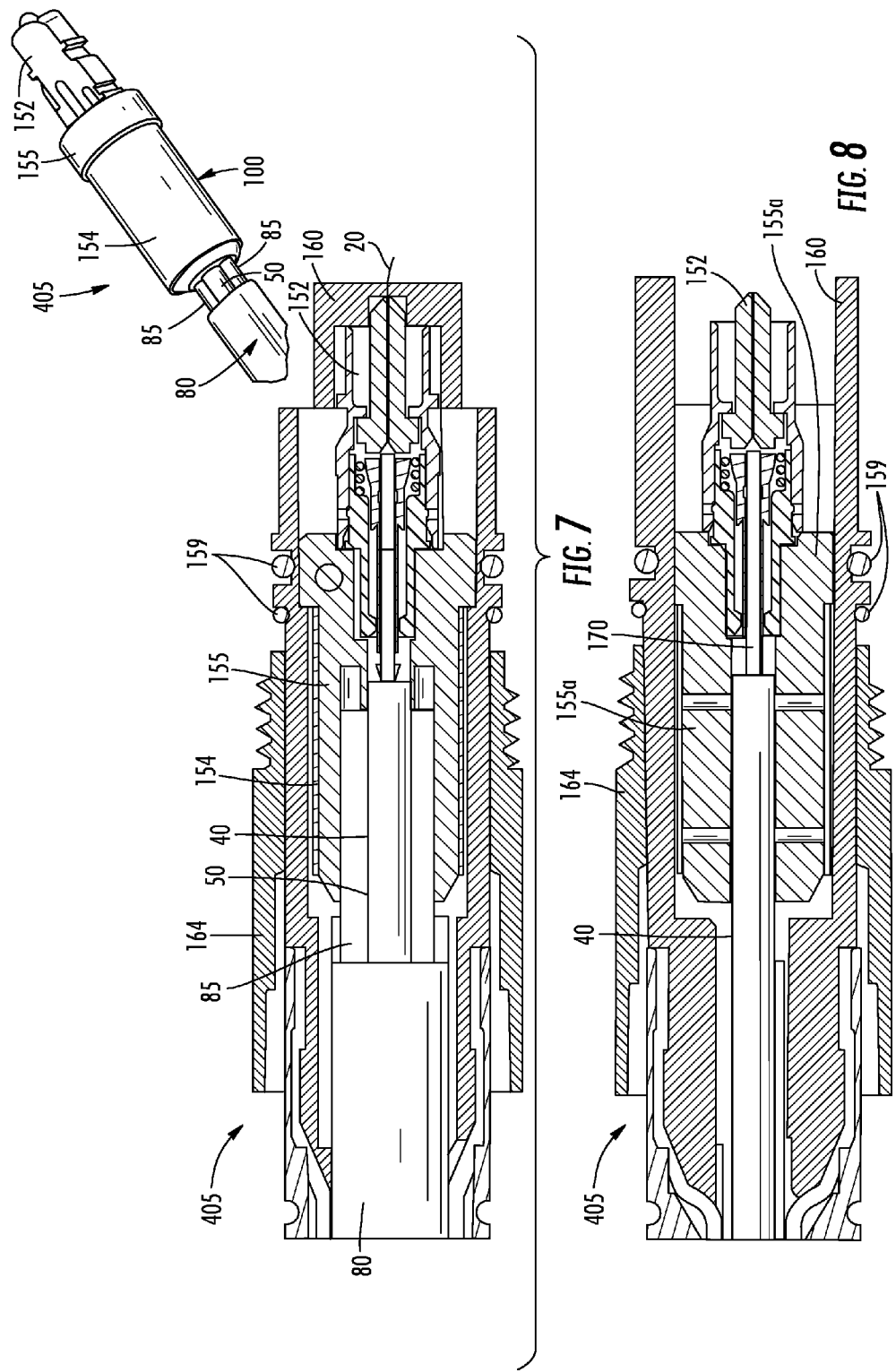

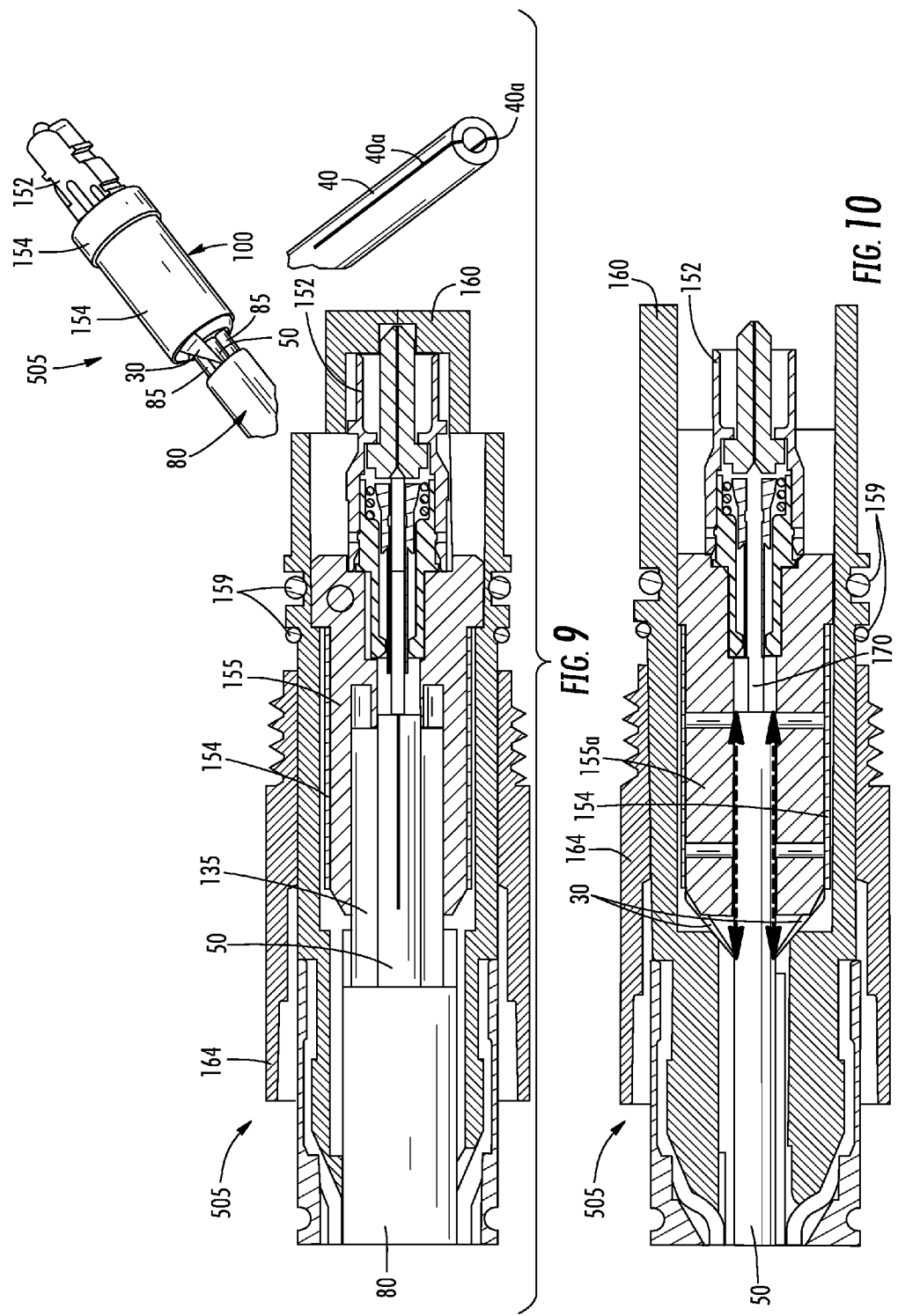

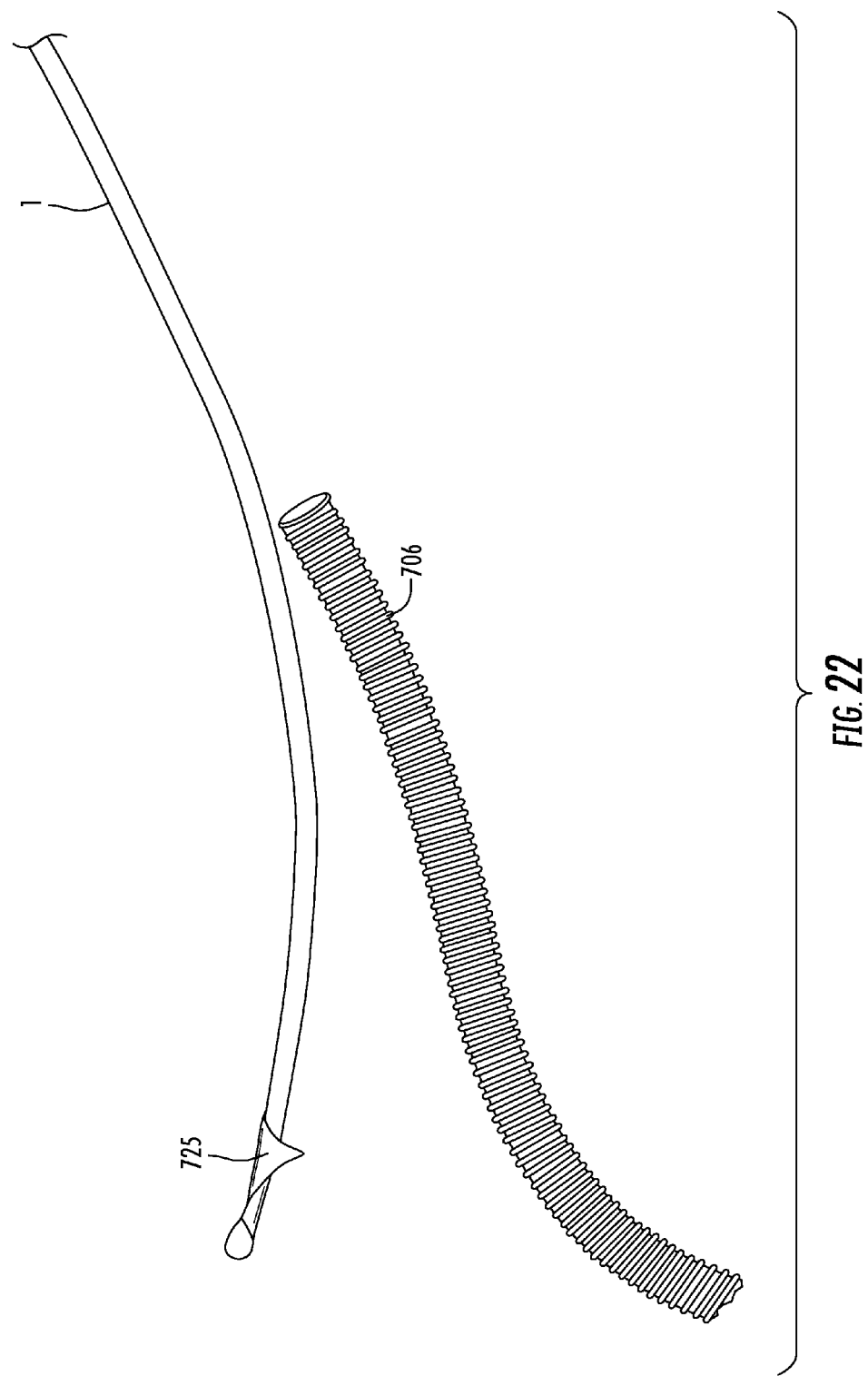

PRECONNECTORIZED CABLE ASSEMBLIES FOR INDOOR/OUTDOOR APPLICATIONS

RELATED APPLICATIONS

This application is a continuation of International Application No. PCT/US12/51041, filed Aug. 16, 2012, which claims the benefit of priority to U.S. Application No. 61/524,151, filed Aug. 16, 2011, both applications being incorporated herein by reference.

BACKGROUND

The disclosure is directed to fiber optic cable assemblies that are preconnectorized with a hardened connector on at least one end. More specifically, the disclosure is directed to fiber optic cable assemblies that are preconnectorized with a hardened connector using a fiber optic cable that includes a subunit surrounded by an upjacketed portion.

Optical fiber is increasingly being used for a variety of applications, including but not limited to broadband voice, video, and data transmission. Optical networks typically include patch panels (i.e., arrays of connectors) at distribution locations such as when routing optical fiber toward subscribers. The patch panels provide a common location where moves, adds, or changes to connectivity of the channels of the optical network can be made and verified. Typically, the patch panels have the optical fibers connections arranged in an enclosure or housing that has limited space for slack storage, fiber management, the patch panel and the like.

For example, an outdoor enclosure having a patch panel or connection location may be connected to an enclosure or housing located within a premises, multi-dwelling unit (MDU), a business or the like using a cable assembly. Consequently, there exists a need for cable assemblies that can span rugged installation environments spanning outdoor environments while protecting the optical fiber and still be routed into enclosures or patch panels that require highly bendable cables for routing, slack storage and efficient cable management. Moreover, the solution should allow the craft to perform the installation in a quick and reliable manner.

SUMMARY

The disclosure is directed to cable assemblies including a cable having a subunit surrounded by an upjacketed portion, where the subunit includes at least one optical fiber and a plurality of tensile yarns disposed within a subunit jacket and, the upjacketed portion includes strength components such as glass-reinforced plastic (GRP) rods disposed about the subunit and within a jacket. In one embodiment, a hardened fiber optic connector is attached to the at least one optical fiber at a first end of the cable so it is strain-relieving at least some of the plurality of tensile yarns of the subunit and the strength components of the upjacketed portion of the cable. The hardened fiber optic connector includes a crimp body, wherein some of the plurality of tensile yarns of the subunit are attached to the crimp body and the strength components of the upjacketed portion are also attached to the crimp body.

By strain-relieving both the tensile yarns of the subunit and the strength components of the upjacketed portion as disclosed herein independent coupling is advantageously provided to the tensile yarns and the strength components. Consequently, an adaptable cable assembly is provided that may or may not use the upjacket portion of the cable at the second end for termination and/or strain relief. By way of example, the second end of the cable assembly may be terminated using a similar hardened connector or a non-hardened connector as desired. For instance, an upjacketed portion of the cable may be stripped from the second end of the cable leaving the subunit for termination using a non-hardened connector that is strain-relieved using the tensile yarns of the subunit. Thus, the cable assembly provides continuous strain-relief from the hardened connector to other connector whether the upjacketed portion is removed or not by strain-relieving the tensile yarns at both connectors. Further, removing the upjacket portion also advantageously allows a relatively small footprint for the assembly at the second end since the subunit is highly flexible compared with the fiber optic cable with the upjacketed portion.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 3 and 4 are partial cross-sectional views of another preconnectorized hardened connector attached to a fiber optic cable that includes a subunit surrounded by a upjacketed portion according to a second concept where the tensile yarns are disposed between shells of the crimp body with the views taken along different longitudinal planes;

FIGS. 5 and 6 are partial cross-sectional views of still another preconnectorized hardened connector attached to a fiber optic cable that includes a subunit surrounded by an upjacketed portion according to a third concept similar to the first concept but further uses a protective tube about a portion of the fiber with the views taken along different longitudinal planes;

FIGS. 7 and 8 are partial cross-sectional views of yet another preconnectorized hardened connector attached to a fiber optic cable that includes a subunit surrounded by an upjacketed portion according to a fourth concept that directs the subunit jacket into the crimp body with the views taken along different longitudinal planes;

FIGS. 9 and 10 are partial cross-sectional views of yet still another preconnectorized hardened connector attached to a fiber optic cable that includes a subunit surrounded by an upjacketed portion according to a fifth concept that directs the subunit jacket into the crimp body and has tensile yarns disposed in slits of the subunit jacket with the views taken along different longitudinal planes;

FIGS. 14-22 depicts views of the pulling grip illustrated in FIGS. 12 and 13 showing its structure and detail as it is removed from the representative cable assembly.

DETAILED DESCRIPTION OF THE PREFERRED EMBODIMENTS

Figures 1, 2:
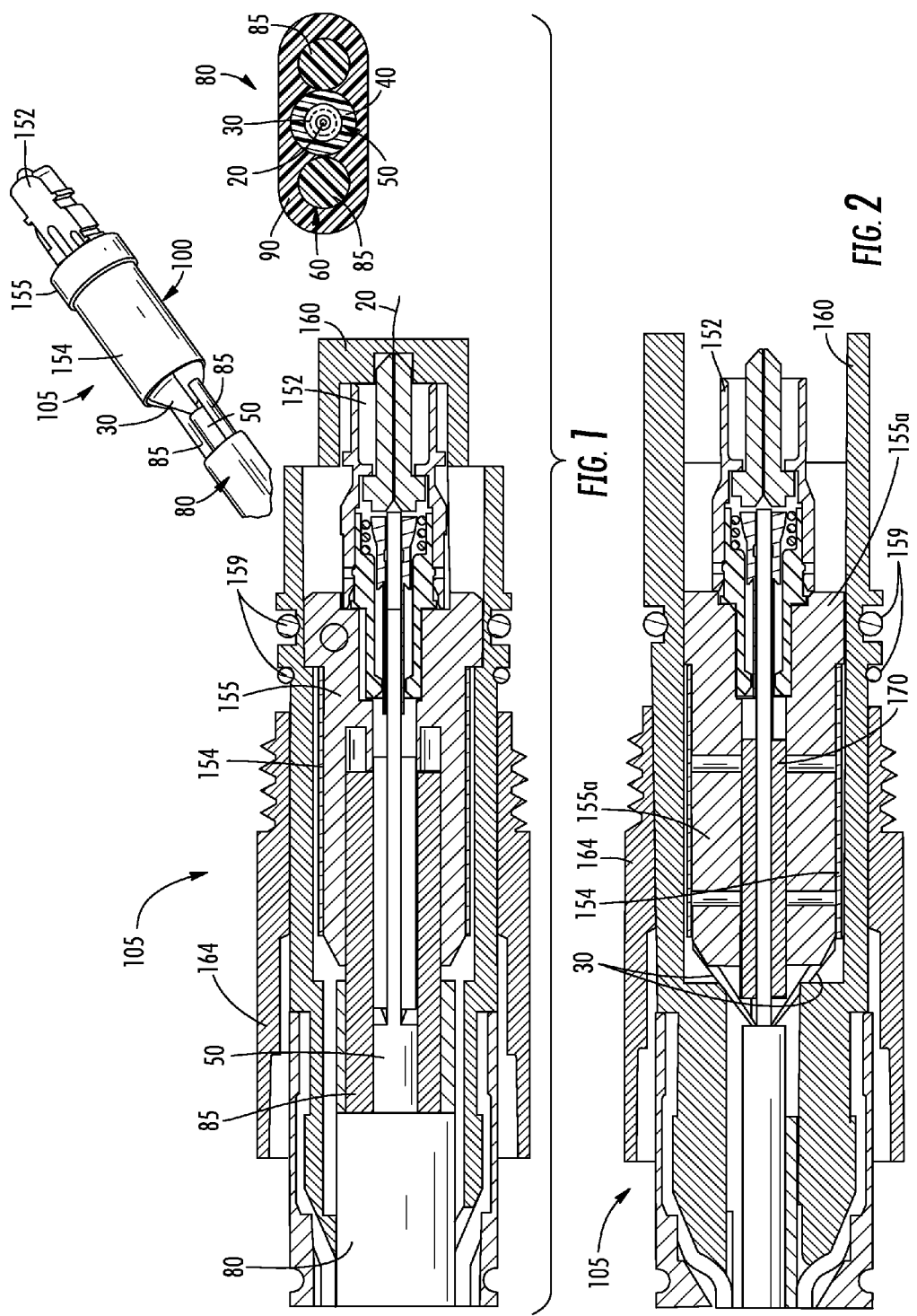
FIGS. 1 and 2 are partial cross-sectional views of a preconnectorized hardened connector attached to a fiber optic cable that includes a subunit surrounded by a upjacketed portion according to a first concept of attaching tensile yarns and strength components to the hardened connector with the views taken along different longitudinal planes.

Reference will now be made in detail to the preferred embodiments of the disclosure, examples of which are illustrated in the accompanying drawings. Whenever possible, like reference numbers will be used to refer to like components or parts.

The cable assemblies described herein are preconnectorized at the factory on at least one end and are suitable for making optical and/or electrical connections for a variety of devices. The concepts of the disclosure advantageously allow the simple, quick, and economical cable assemblies for deployment by the craft in the field Reference will now be made in detail to the preferred embodiments, examples of which are illustrated in the accompanying drawings. Whenever possible, like reference numbers will be used to refer to like components or parts.

Cable assemblies having several different types of cable termination to the hardened fiber optic connector using cables with a subunit are disclosed herein for providing a robust yet flexible solution for routing optical fiber toward the subscriber. In one embodiment, the hardened fiber optic connector is attached to at least one optical fiber of the fiber optic cable at a first end having a subunit and an upjacketed portion while strain-relieving both the subunit and the upjacketed portion. In certain respects the different hardened fiber optic connectors disclosed herein are similar to the fiber optic connectors disclosed in U.S. Pat. Nos. 7,111,990; 7,090,406; 7,090,407 and 7,113,679, the disclosures of which are incorporated by reference herein.

Discussed and disclosed are embodiments of the cable assemblies using fiber optic cables having subunits with a plurality of tensile yarns disposed within the subunit jacket and strength components disposed radially outward of the subunit in an upjacketed portion, where the hardened connector is attached to the optical fiber and strain-relieves at least some of the plurality of tensile yarns and strength components as discussed and disclosed herein. The cable assemblies disclosed herein may also optionally include a second connector attached to the optical fiber of the cable at a second end such as an non-hardened connector or a hardened connector as desired. Further, the cable assemblies disclosed herein may also optionally include a pulling grip assembly about the connector on the second end of the cable such as the non-hardened connector.

The cable assemblies disclosed herein include a fiber optic cable 80 (hereinafter "cable") having a subunit 50 surrounded by an upjacketed portion 60 such as shown in the upper right corner of FIG. 1. Cable 80 is a representative cable and other variations of the design are possible as desired according to the concepts disclosed. The subunit 50 includes at least one optical fiber 20 and a plurality of tensile yarns 30 such as Kevlar, fiberglass, or the like disposed within a subunit jacket 40. In other words, the tensile yarns 30 form a portion of the subunit and are internal to the subunit jacket 40. The upjacketed portion 60 of fiber optic cable 80 includes "strength components" 85 such as glass-reinforced plastic (GRP) members having anti-buckling strength disposed about the subunit 50 (i.e., disposed radially outward of the subunit) and within a jacket 90. In other words, the strength components 85 are disposed on opposite sides of the subunit 50 in a generally linear arrangement. As shown, the subunit 50 is round and the strength components 85 are disposed on opposite sides of the subunit and jacket 90 has a generally flat profile. Variations on the cable 80 are possible. By way of example, the at least one optical fiber can optionally include a buffer layer with a diameter greater than 250 microns for providing further protection to the optical fiber such as 500, 700 or 900 microns, but other nominal sizes are possible. As another example, the jacket 90 of the upjacketed portion may have other cross-sectional profiles besides generally flat such as round, oval, tri-lobal, etc. Moreover, the hardened connector may terminate more than one optical fiber.

Using cables with a subunit has advantages. For instance, the subunit 50 of cable 80 may be broken out from the cable 80 for attaching a second connector to a second end of the subunit 50 (See FIG. 11). This ability to break-out the subunit and attach a different type of fiber optic connector is advantageous for routing the cable assembly from an indoor location such as near the subscriber and to an outdoor location where a hardened connector is desired. Simply stated, a portion of subunit is broken-out from the second end of the cable assembly and there is no need to strain-relieve (i.e., attach) the upjacketed portion of the cable since the tensile yarns of the subunit are strain-relieved. Moreover, the subunit provides a much smaller and highly flexible fiber optic cable at the second end of the cable assembly for deployment.

FIGS. 1 and 2 depict partial cross-sectional views of a preconnectorized hardened fiber optic connector 100 attached to a fiber optic cable 80 that includes a subunit 50 for forming a first cable assembly 105. Connector 100 is attached to the at least one optical fiber 20 at a first end of cable 80. Connector 100 includes a crimp body 155 used for securing a connector assembly 152 at the front of the crimp body 155 as shown in the perspective view. Connector assembly 152 can be any suitable connector assembly such as a SC or a LC connector assembly having a ferrule and a connector housing along with other suitable components such as a spring or spring push. The crimp body 155 may include a first shell 155a and a second shell 155a to form crimp body 155. As shown, the strength components 85 of the upjacketed portion 90 are exposed from the upjacketed portion and then disposed between first shell 155a and second shell 155a. A crimp band 154 may be used for securing the shells 155a of crimp body 155 as desired. Additionally, an adhesive or bonding agent may be used with or without crimp band 154 to attach or secure strength component 85 disposed between shells 155.

This embodiment also shows that the some of the plurality of tensile yarns 30 of subunit 50 are attached to the crimp body 155. By way of example, some of the plurality of tensile yarns 30 are attached between crimp body 155 and crimp band 154 as shown. In other words, the ends of the tensile yarns 30 are sandwiched between the outer barrel of the crimp body 155 and crimp band 154 and then the crimp band is secured (i.e., crimped) to strain-relieve the tensile yarns 30. Also depicted in this embodiment, the optical fiber 20 of subunit 50 enters a protective tube 170 at least partially disposed within the crimp body. More specifically, this embodiment shows a buffer layer 20a on optical fiber 20 and the buffer layer is threaded through (i.e., enters) a protective tube 170 at least partially disposed within crimp body 155 in this embodiment. Protective tube 170 can have any suitable size, shape and/or length as desired that allows for suitable performance with optical fiber 20. Also in this embodiment, the buffer layer enters the connector assembly 152. Moreover, the subunit jacket 40 does not enter the crimp body 155. Moreover, the geometry of shells 155a of crimp body 155 can be modified for the particular embodiments shown to provide adequate sizing of passageways and the like for the various embodiments.

Connector 100 may also include other components as desired. By way of explanation, connector 100 can have the assembly shown in the upper right corner at least partially disposed within a shroud 160 and a coupling nut 164 disposed rotatably thereon as shown in the cross-sectional views. It should be noted that the assembly shown in the upper right hand corner is a functional connector and may be used without further components. Shroud 160 may include a keying feature for orientating the assembly in the upper right corner relative to the shroud 160. Shroud 160 may also include one or more fingers for protecting and keying the connector 100 along with one or more shoulders along its length. Coupling nut 164 has a threaded portion for mating with a complimentary receptacle and/or for securing a cap to the connector when not in a mated configuration. Connector 100 also includes one or more O-rings 159 for sealing the connector 100 from environmental effects when mated.

FIGS. 3 and 4 depict partial cross-sectional views of a preconnectorized hardened fiber optic connector 100 attached to a fiber optic cable 80 that includes a subunit 50 for forming a second cable assembly 205. Cable assembly 205 is similar to cable assembly 105 with connector 100 being attached to the at least one optical fiber 20 at a first end of cable 80. Connector 100 includes a crimp body 155 used for securing a connector assembly 152 at the front of the crimp body 155 as shown in the unlabeled perspective view. The crimp body 155 may include a first shell 155a and a second shell 155a to form crimp body 155. As shown, the strength components 85 of the upjacketed portion 90 are exposed and then disposed between first shell 155a and second shell 155a. A crimp band 154 may be used for securing the shells 155a of crimp body 155 as desired. Additionally, an adhesive or bonding agent may be used with or without crimp band 154 to attach or secure strength component 85 disposed between shells 155.

This embodiment has subunit jacket 40 entering the crimp body 155. Moreover, a buffer layer 20a on optical fiber 20 is at least partially disposed within crimp body 155. Also in this embodiment, the buffer layer enters the connector assembly 152. As shown, tensile yarns 30 of subunit 50 enter the crimp body 155 and flare out inside the shells 155a of crimp body 155. In other variations, the tensile yarns 30 may be secured to the connector assembly 152 or other structure as desired.

FIGS. 5 and 6 depict partial cross-sectional views of a preconnectorized hardened fiber optic connector 100 attached to a fiber optic cable 80 that includes a subunit 50 for forming a third cable assembly 305. Cable assembly 305 is similar to cable assembly 105 with connector 100 being attached to the at least one optical fiber 20 at a first end of cable 80. Connector 100 includes a crimp body 155 used for securing a connector assembly 152 at the front of the crimp body 155 as shown in the unlabeled perspective view. The crimp body 155 may include a first shell 155a and a second shell 155a to form crimp body 155. As shown, the strength components 85 of the upjacketed portion 90 are exposed and then disposed between first shell 155a and second shell 155a. A crimp band 154 may be used for securing the shells 155a of crimp body 155 as desired. Additionally, an adhesive or bonding agent may be used with or without crimp band 154 to attach or secure strength component 85 disposed between shells 155.

This third embodiment also shows that the some of the plurality of tensile yarns 30 of subunit 50 are attached to the crimp body 155. By way of example, some of the plurality of tensile yarns 30 are attached between crimp body 155 and crimp band 154. Also depicted in this embodiment, the optical fiber 20 of subunit 50 enters a protective tube 170 at least partially disposed within the crimp body and at least partially disposed in the connector assembly 152. More specifically, this embodiment shows a buffer layer 20a on optical fiber 20 and the buffer layer is threaded through (i.e., enters) a protective tube 170. Moreover, the subunit jacket 40 does not enter the crimp body 155. This embodiment uses a smaller protective tube 170 than cable assembly 105 and a portion of the protective tube 170 can be disposed within subunit 50 as desired.

FIGS. 7 and 8 depict partial cross-sectional views of a preconnectorized hardened fiber optic connector 100 attached to a fiber optic cable 80 that includes a subunit 50 for forming a fourth cable assembly 405. Cable assembly 405 is similar to cable assembly 105 with connector 100 being attached to the at least one optical fiber 20 at a first end of cable 80. Connector 100 includes a crimp body 155 used for securing a connector assembly 152 at the front of the crimp body 155 as shown in the unlabeled perspective view. The crimp body 155 may include a first shell 155a and a second shell 155a to form crimp body 155. As shown, the strength components 85 of the upjacketed portion 90 are exposed and then disposed between first shell 155a and second shell 155a. A crimp band 154 may be used for securing the shells 155a of crimp body 155 as desired. Additionally, an adhesive or bonding agent may be used with or without crimp band 154 to attach or secure strength component 85 disposed between shells 155.

This fourth embodiment has subunit jacket 40 entering the crimp body 155. Moreover, a buffer layer 20a on optical fiber 20 is at least partially disposed within crimp body 155. Also in this embodiment, the buffer layer enters the connector assembly 152. As shown, tensile yarns 30 of subunit 50 are cut approximately even with the end of subunit jacket 40 and does not exit the crimp body 155 and, thus they are not strain-relieved to connector 100.

FIGS. 9 and 10 depict partial cross-sectional views of a preconnectorized hardened fiber optic connector 100 attached to a fiber optic cable 80 that includes a subunit 50 for forming a fifth cable assembly 505. Cable assembly 505 is similar to cable assembly 105 with connector 100 being attached to the at least one optical fiber 20 at a first end of cable 80. Connector 100 includes a crimp body 155 used for securing a connector assembly 152 at the front of the crimp body 155 as shown in the unlabeled perspective view. The crimp body 155 may include a first shell 155a and a second shell 155a to form crimp body 155. As shown, the strength components 85 of the upjacketed portion 90 are exposed and then disposed between first shell 155a and second shell 155a. A crimp band 154 may be used for securing the shells 155a of crimp body 155 as desired. Additionally, an adhesive or bonding agent may be used with or without crimp band 154 to attach or secure strength component 85 disposed between shells 155.

This fifth embodiment also shows that the some of the plurality of tensile yarns 30 of subunit 50 are attached to the crimp body 155. By way of example, some of the plurality of tensile yarns 30 are attached between crimp body 155 and crimp band 154 (i.e, positioned between the outer barrel of the crimp body 155 and the crimp band 154 and then secured by deforming the crimp band 154). Moreover, the subunit jacket 40 and the buffer layer on the fiber (if included) enter the crimp body 155 as shown while also having the tensile yarns 30 secured. To accommodate this construction the subunit jacket has at least one or more splits 40a, 40b within the crimp body 155 as shown. As depicted in the view to the right, subunit jacket 40 has two splits 40a,40b that are disposed on opposite sides. Moreover, the splits 40a, 40b extend rearward of the crimp body 155 so that the tensile yarns 30 may be secured between the crimp body 155 and crimp band 154. Also, the optical fiber 20 of subunit 50 enters the crimp body. More specifically, this embodiment shows a buffer layer 20a on optical fiber 20 at least partially disposed within crimp body 155 and entering the connector assembly 152.

Figure 11:
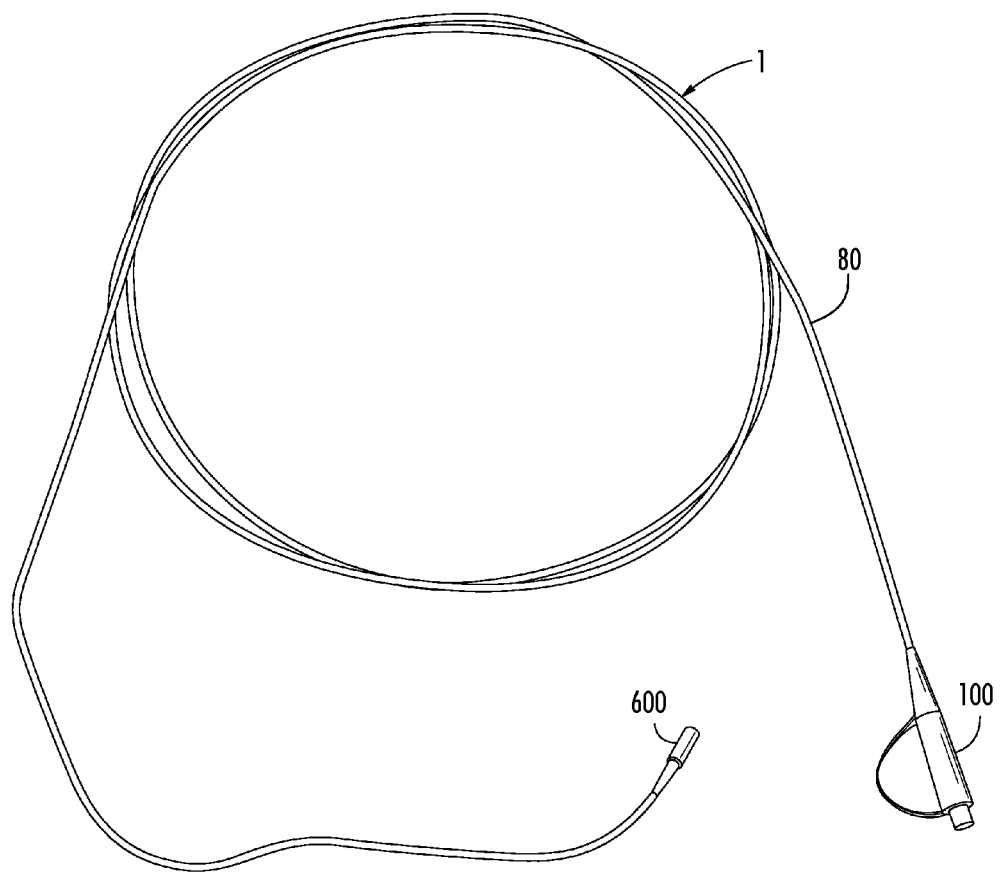
FIG. 11 is a perspective view showing a representative cable assembly having a hardened connector on one end and a second connector on the other end of the fiber optic cable.

FIG. 11 depicts a perspective view showing a representative cable assembly 1 having a hardened connector 100 on a first end of the cable and a second connector 600 attached to the at least one optical fiber at the second end of the cable. Cable assembly 1 represents any of the cable assemblies disclosed herein. The second connector may be a hardened connector such as disclosed herein or an indoor connector such as shown in FIG. 11. As shown, the hardened connector 100 also includes a cap installed on the same which may include a pulling eye for attaching a pull tape to that end of the cable assembly. By way of example, the hardened connector may be an OptiTap® connector available from Corning Cable Systems LLC of Hickory, N.C. and the second connector may be a LC, SC, ST or other suitable connector. However, the concepts disclosed may be used with any suitable connectors on either end.

Figure 12:
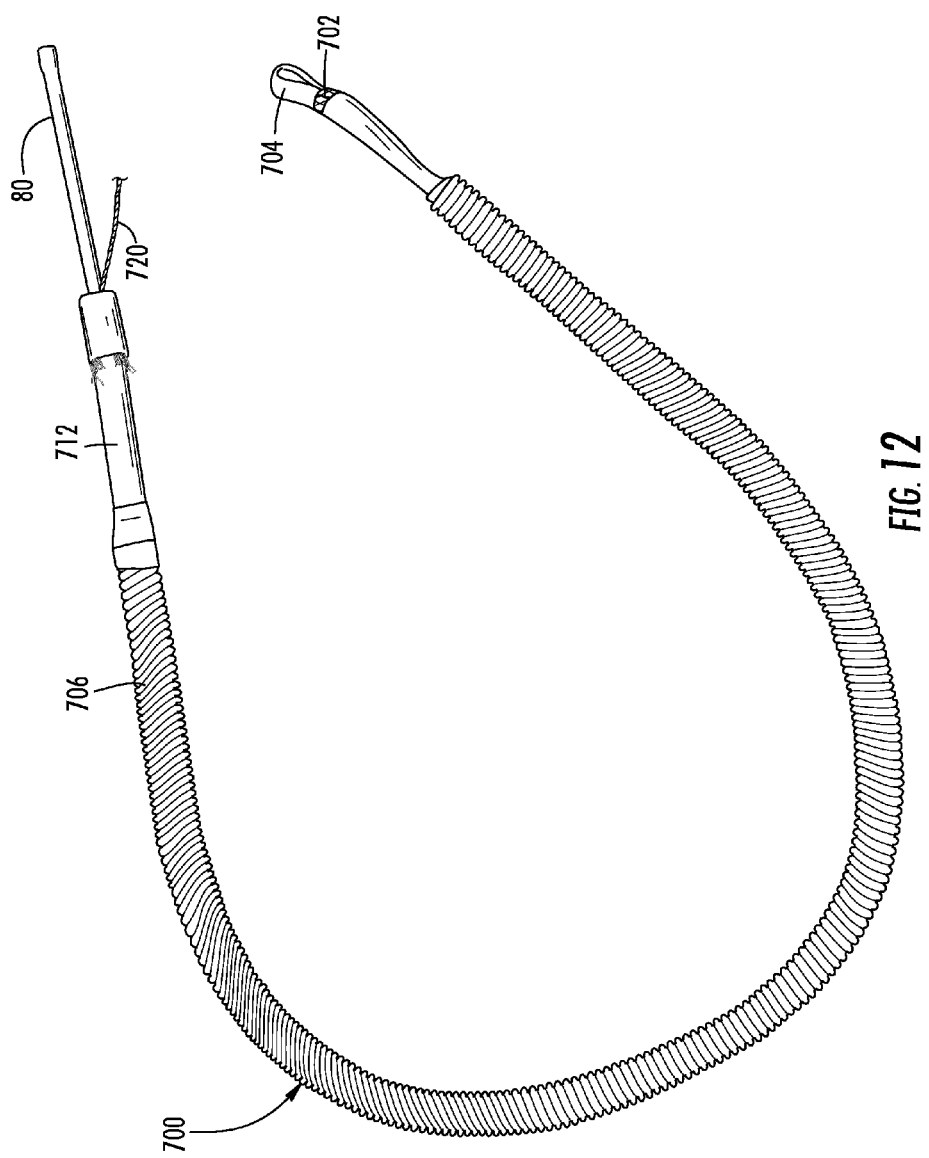
FIGS. 12 and 13 respectively are perspective views of a portion of a representative cable assembly disclosed herein having a pulling grip assembly installed about a second connector on the second end of the cable assembly.

The cable assemblies disclosed herein may also optionally include a pulling grip assembly 700 disposed about one or more ends of the cable assembly 1 such as shown in FIG. 12. For instance, the second end of the cable assembly 1 may include the pulling grip assembly 700 disposed about a portion of second connector 600 for protecting the same during installation by the installer. Additionally, the pulling grip assembly advantageously provides the user with the ability to quickly and easily install the cable assembly without having to create a pulling grip in the field or be concerned about damaging the cable assembly. By way of example, the pulling grip assembly allows a pulling force of 100 pounds or more to be applied to the cable assembly and inhibiting damage to the assembly and in other embodiments the pulling grip assembly allows for a pulling force of 150 pounds or more. Any suitable pulling grip assemblies are possible with the cable assemblies disclosed. FIG. 22 shows the cable assembly 1 with a protective wrap 725 disposed about second connector 600 and after the pulling grip assembly 700 is removed.

FIGS. 13-22 depicts views of the pulling grip illustrated in FIG. 12 showing its structure and detail as it is removed from the cable assembly after being pulled into position by the craft. As best shown in FIG. 12, when pulling grip assembly 700 is installed a pulling mesh 702 is arranged to form a pulling loop 704 at an end of the assembly for the craft to attach a pulling tape or the like thereto. Additionally, the pulling grip assembly 700 includes a ripcord 720 for aiding in the removal of the pulling grip assembly from the cable assembly 1 at a far end. The pulling grip assembly 700 also includes a tubing 706 such as corrugated tubing that may be split along its length and that surrounds a portion of the pulling mesh 702 and a sock 710 that is used for maintaining the pulling mesh in position within the pulling grip assembly 700.

Figure 13:
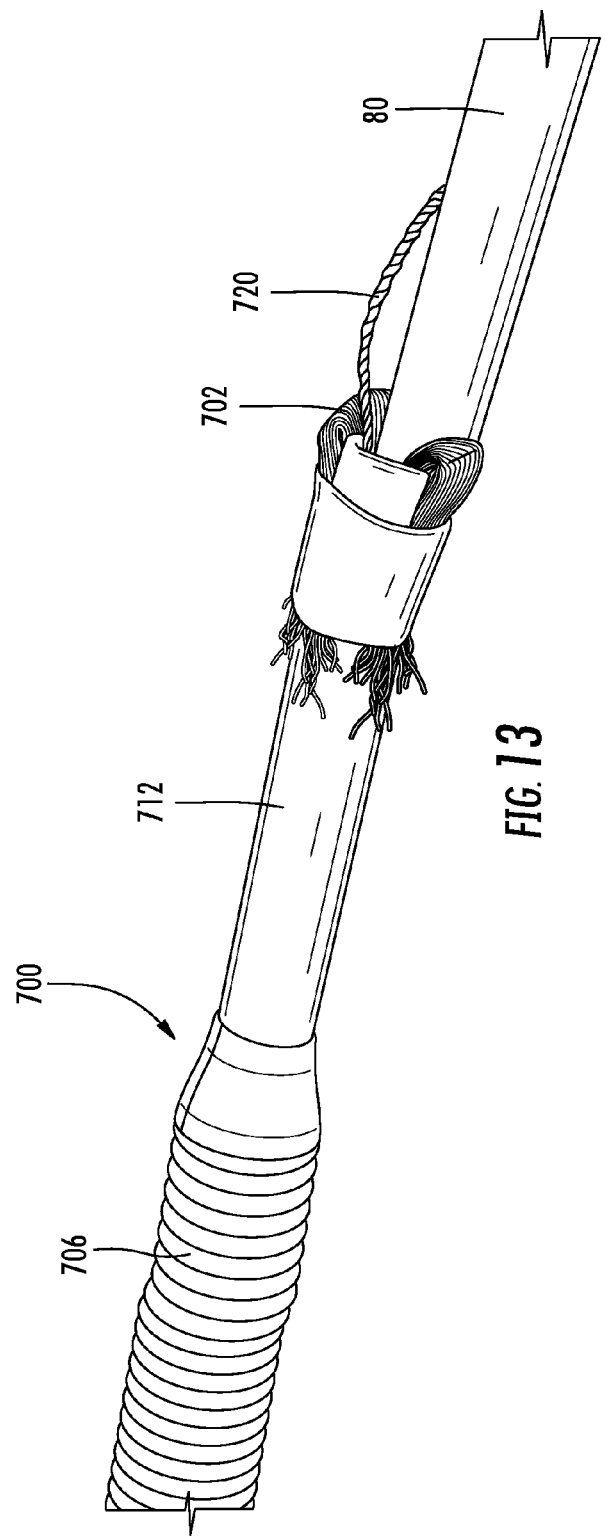
Figure 14:
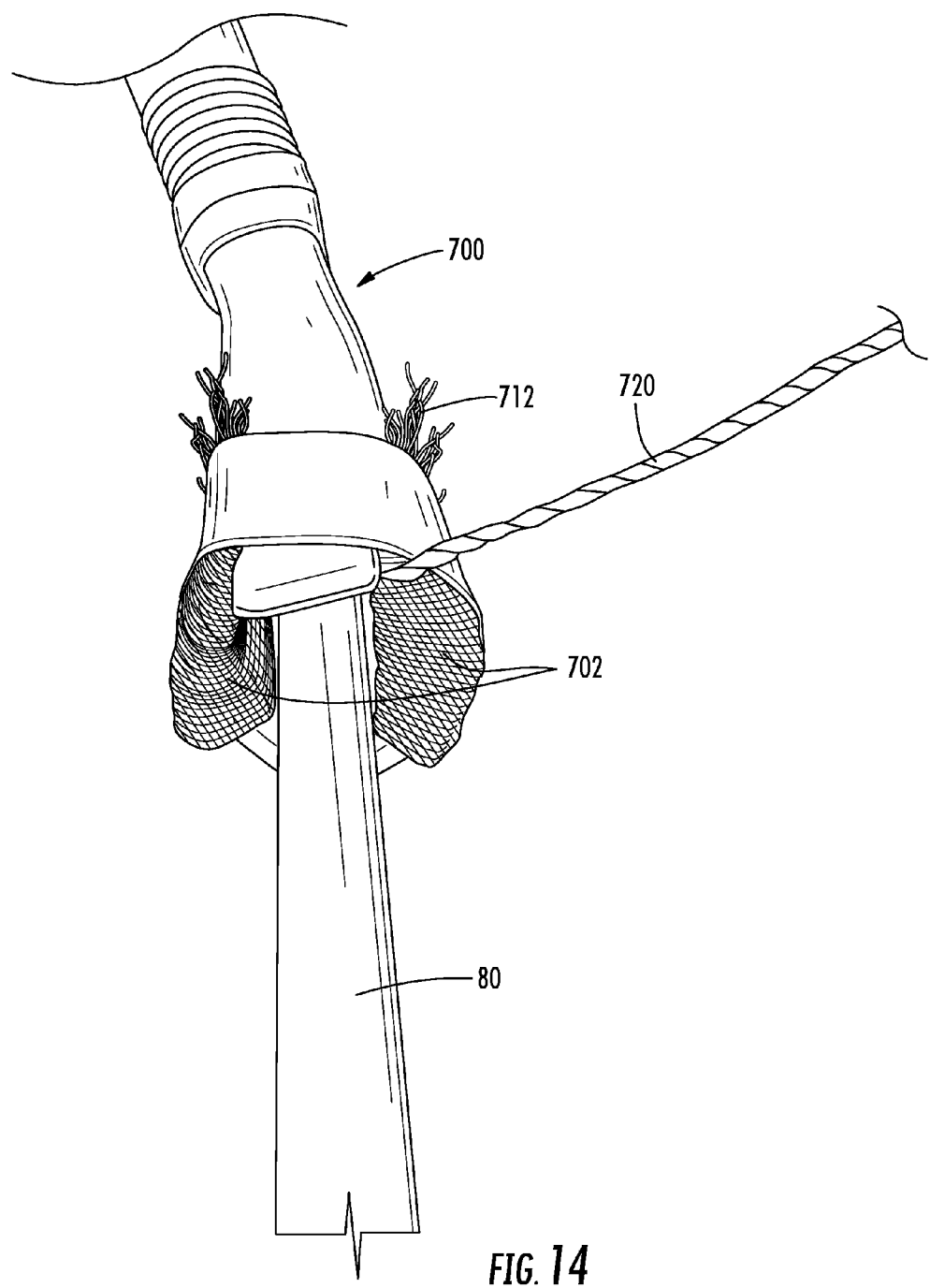

FIG. 13 is a close-up view of a portion of the pulling grip assembly 700 showing the transition from the fiber optic cable 80 of cable assembly 1 to the pulling grip assembly 700. As shown the pulling grip assembly preferably extends far enough along cable assembly 1 to cover the subunit cable and to grip onto a portion of cable 80, which provides more tensile strength since it includes the strength components of the upjacketed portion therein. As shown, the pulling mesh 702 is folded in half to form a pulling loop 704 at the end of the assembly and the two legs of the pulling mesh 702 are routed rearward along the cable assembly under the tubing 706 and sock 710 (not visible in this view) and then secured with a heat shrink 712 or the like. As shown, the tubing 706 is then attached to the heat shrink 712 using tape or the like. The tubing 706 does not carry any of the pulling force applied to the pulling grip assembly 700, but instead keeps the structure in place and inhibits snags during use or handling. The two legs of pulling mesh 702 are folded back and optionally secured out of the way with tape or the like onto the cable assembly. Ripcord 720 preferably extends a short distance along the pulling grip assembly 700 for aiding in the removal of the heat shrink 712 and/or tape when removing the pulling grip assembly 700 from the cable assembly 1. FIG. 14 depicts an end view of a portion of the pulling grip assembly 700 showing the transition from the fiber optic cable 80 to the cable assembly 1 to the pulling grip assembly 700.

Figure 15:
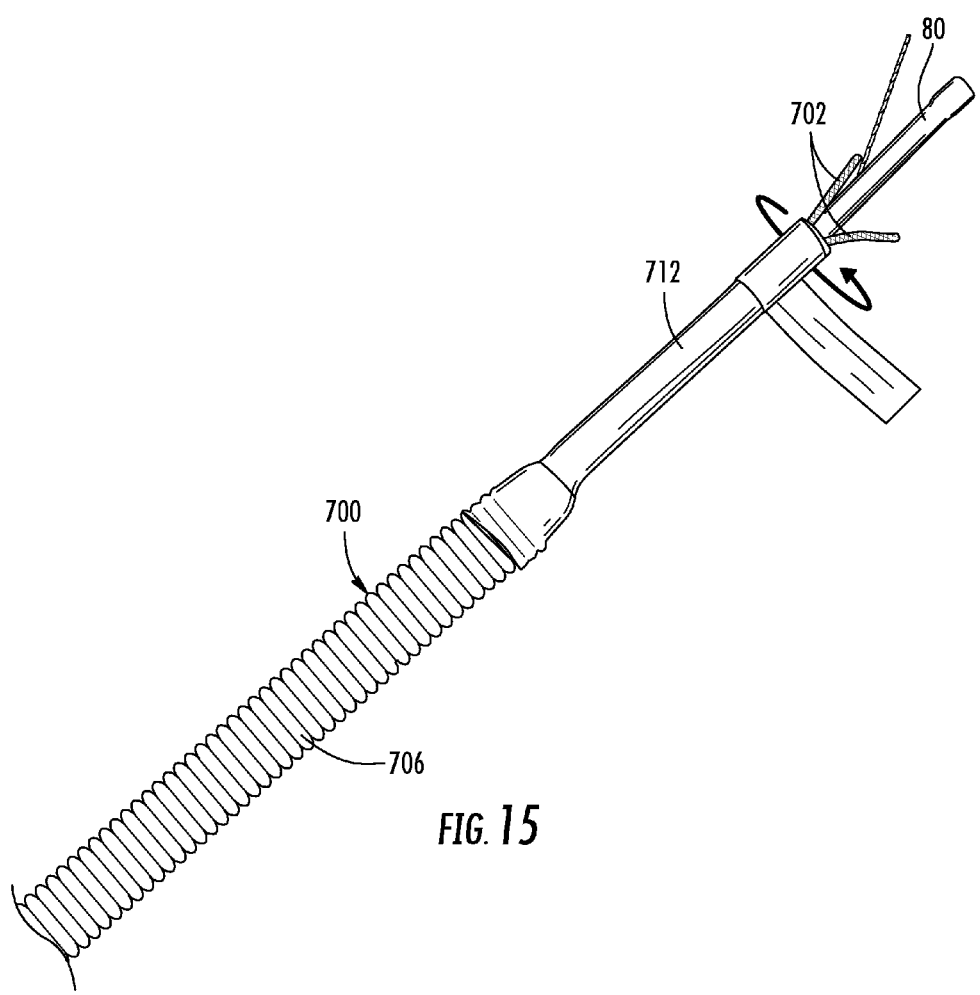
Figure 16:
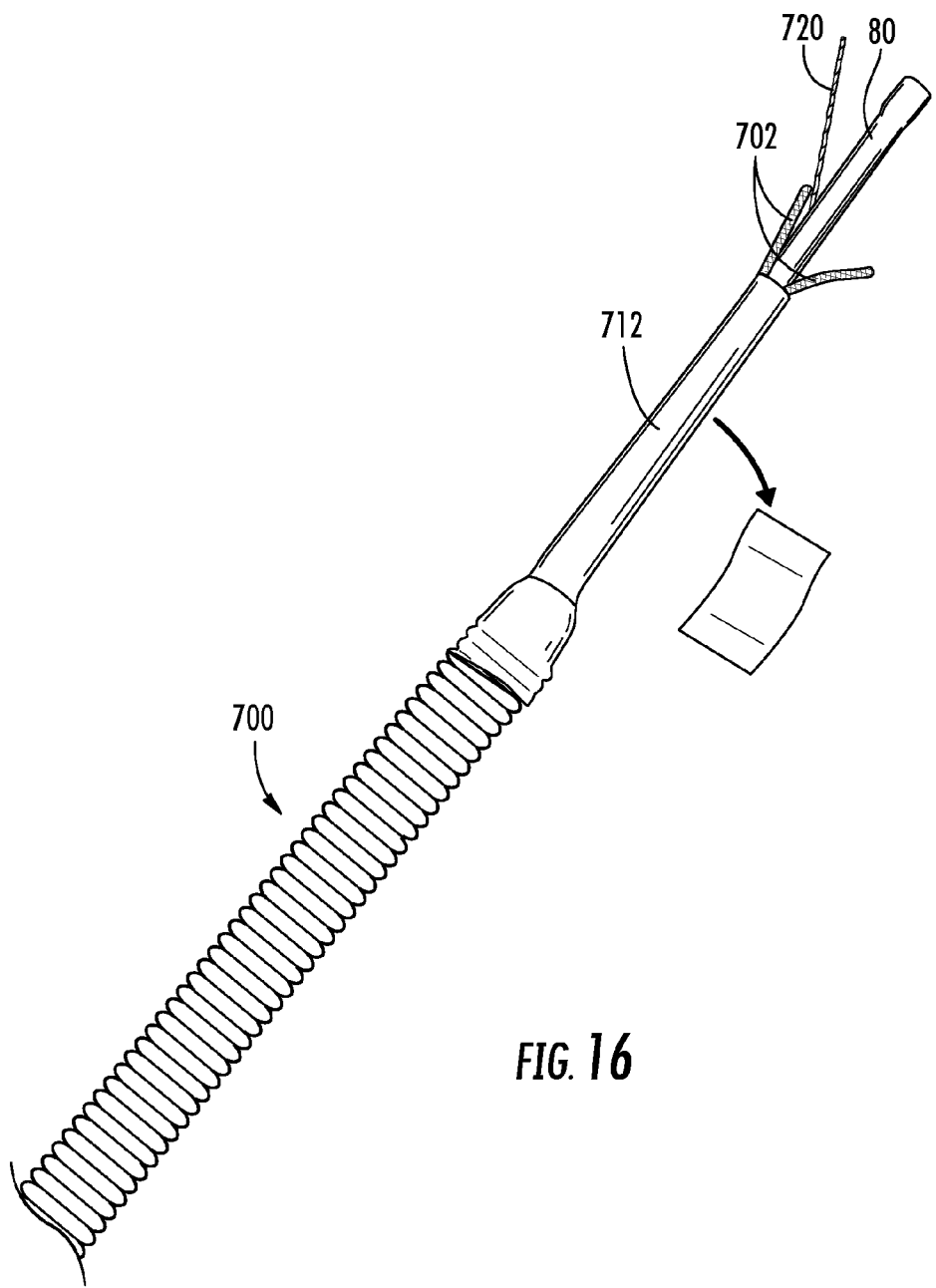
Figure 17:
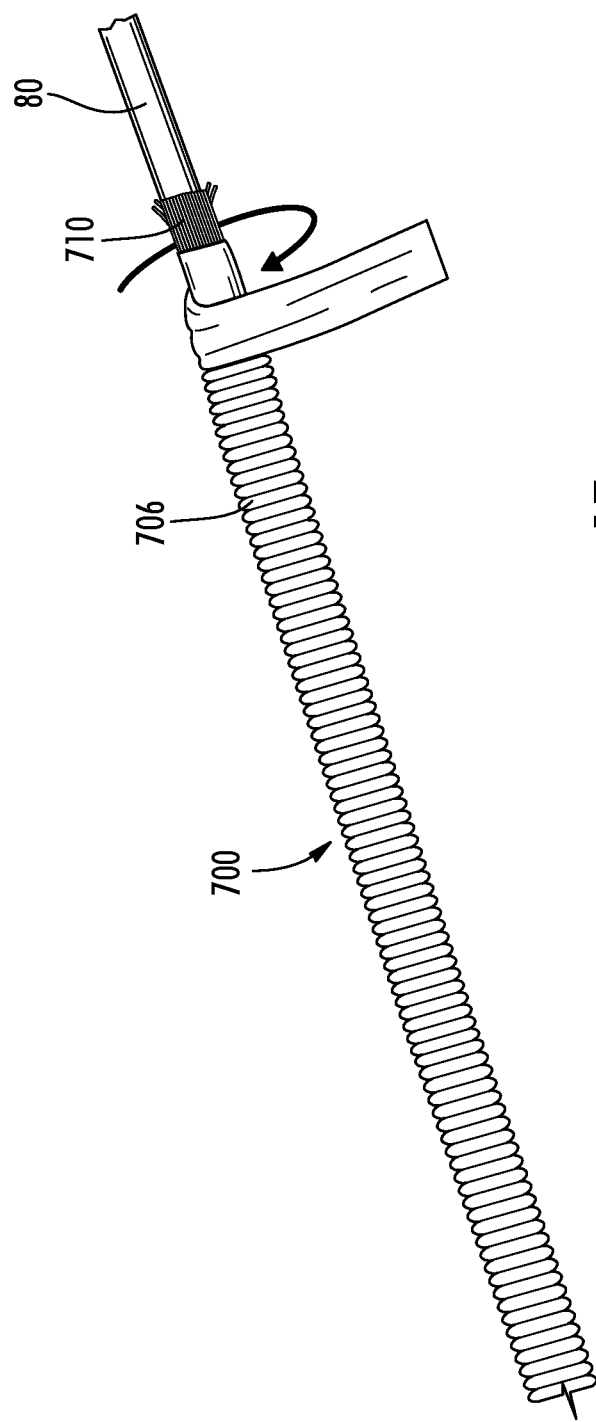
Figure 18:
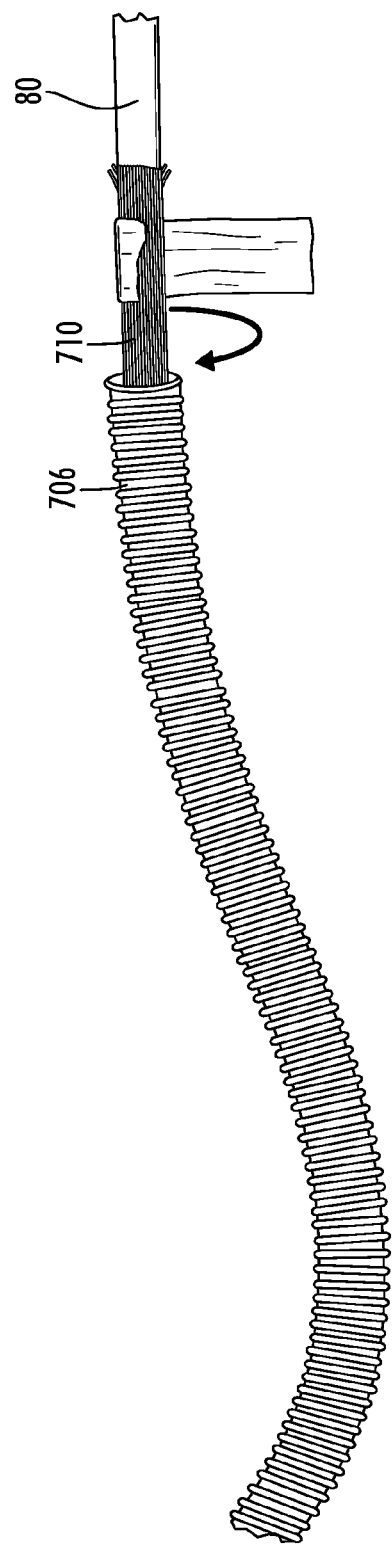
Figure 19:
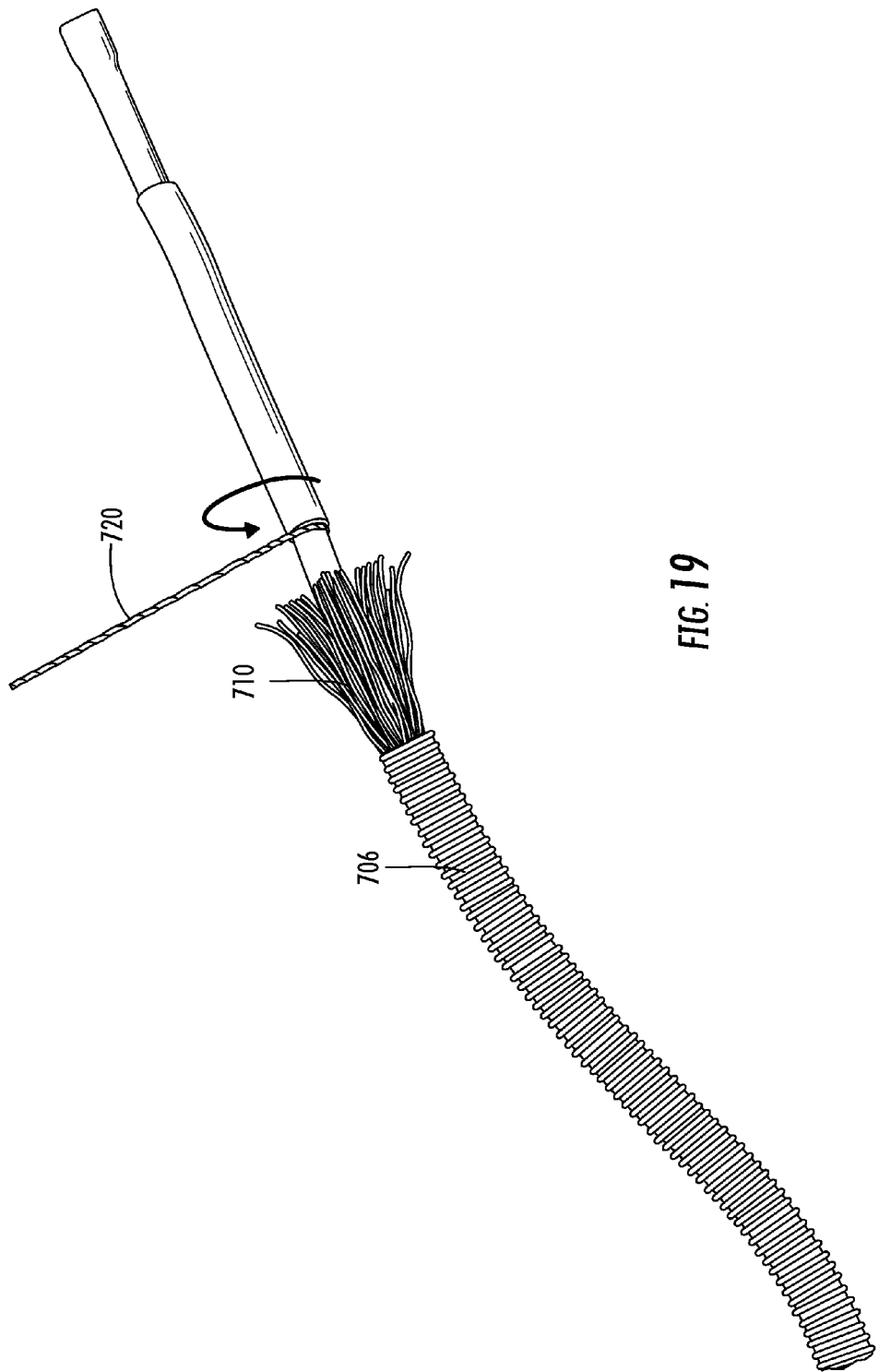
Figure 20:
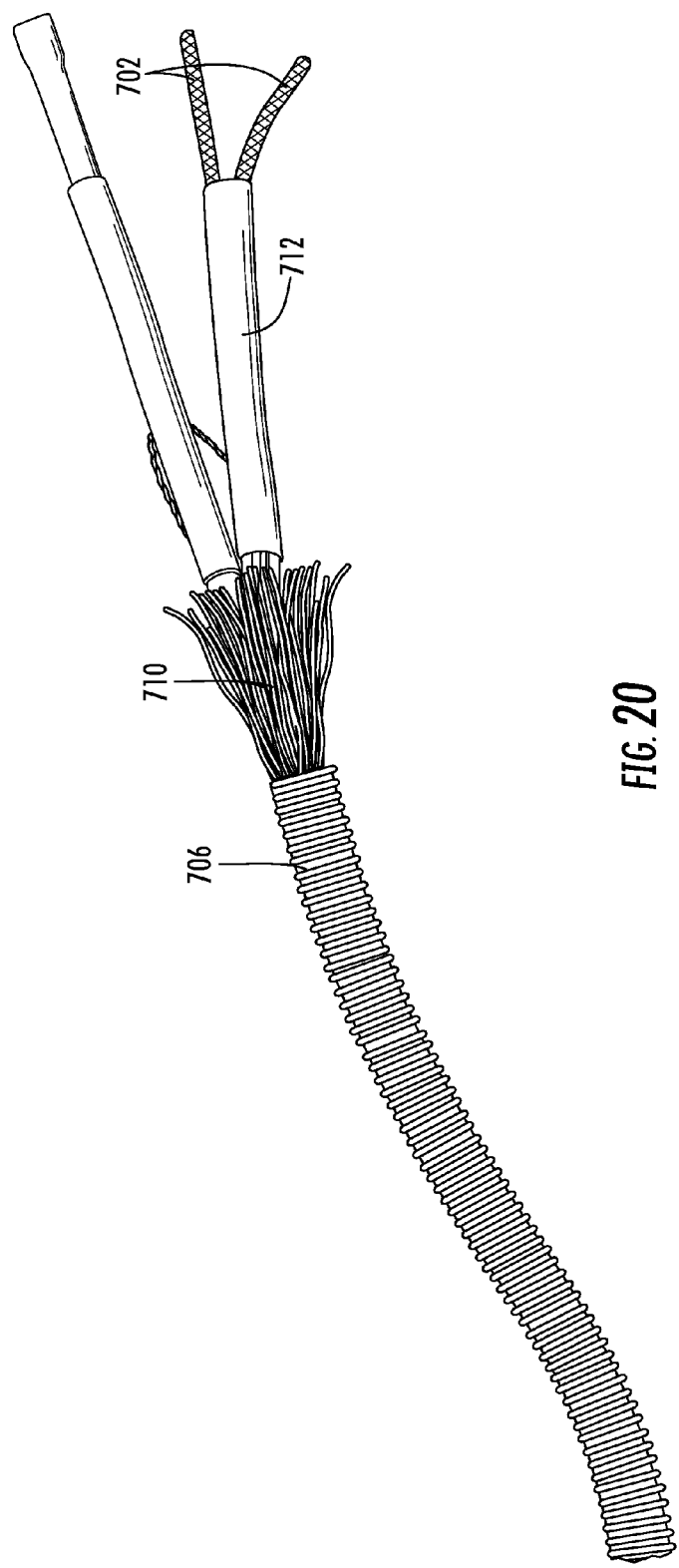
Figure 21:

FIG. 15 shows an optional step of removing the tape securing the legs of pulling mesh 702 by hand so that the ripcord can more easily cut thru an underlying friction tape 704 and the heat shrink. FIG. 16 depicts the tape removed and the released legs of the pulling mesh 702. Next, FIG. 17 shows the tape holding tubing 706 to the heat shrink 712 (or other structure) being removed for exposing sock 710 underneath. FIG. 18 shows the tubing 706 pushed back to expose sock 710 and removing the tape holding the sock 710 in position. After sliding back sock 710 the second end of heat shrink 712 is exposed and ripcord 720 can be pulled thru the heat shrink 712 and any friction tape 704 as best shown in FIG. 19. Friction tape 704 is best shown in FIG. 21 and is applied to a portion of cable assembly 1 so that the pulling grip assembly has a suitable anchor point for grabbing and transferring pulling forces from the pulling mesh 702. FIG. 20 shows the ripcord pulled thru the heat shrink 712 and a portion of the pulling grip assembly removed from cable assembly 1. FIG. 21 shows that the ripcord 720 ripped thru friction tape 704 which is still attached to cable assembly 1. FIG. 21 also shows that one end of the ripcord 720 is secured about cable assembly 1 for providing an anchor point when pulling on the same. FIG. 22 shows the tubing 706 removed from the cable assembly 1 and the pulling mesh 702 in the process of being removed to reveal the protected second connector 600 and, shows the pulling grip assembly 700 removed from cable assembly 1 with an optional protective wrap 725 disposed about the second connector 600.

Also disclosed are methods of making a cable assemblies including the steps of providing a cable having a subunit surrounded by an upjacketed portion, the subunit including at least one optical fiber and a plurality of tensile yarns disposed within a subunit jacket, and the upjacketed portion including strength components disposed about the subunit and within a jacket, providing a hardened connector having a crimp body and a crimp band, and attaching the hardened connector to at least one optical fiber at a first end of the cable and strain-relieving at least some of the plurality of tensile yarns and the strength components of the cable to the crimp body of the hardened fiber optic connector.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A cable assembly, comprising:
    a cable having a subunit surrounded by an upjacketed portion;
        the subunit including at least one optical fiber and a plurality of tensile yarns disposed within a subunit jacket; and
        the upjacketed portion including strength components disposed about the subunit and within a jacket;
    a hardened fiber optic connector attached to the at least one optical fiber at a first end and strain-relieving at least some of the plurality of tensile yarns and the strength components, the hardened fiber optic connector includes a crimp body, wherein some of the plurality of tensile yarns of the subunit are attached to the crimp body and the strength components of the upjacketed portion are attached to the crimp body.

2. The cable assembly of claim 1, wherein some of the plurality of tensile yarns being attached between the crimp body and a crimp band and the strength components being disposed between a first shell and a second shell of the crimp body.

3. The cable assembly of claim 1, wherein the at least one optical fiber has a buffer layer with a diameter greater than 250 microns.

4. The cable assembly of claim 3, wherein the buffer layer enters the crimp body.

5. The cable assembly of claim 3, the hardened fiber optic connector including a connector assembly held at the front of the crimp body and the buffer layer enters the connector assembly.

6. The cable assembly of claim 3, wherein the buffer layer enters a protective tube at least partially disposed within the crimp body.

7. The cable assembly of claim 1, wherein the subunit jacket does not enter the crimp body.

8. The cable assembly of claim 1, the hardened fiber optic connector including a connector assembly held at the front of the crimp body.

9. The cable assembly of claim 1, further including a second connector attached to the at least one optical fiber at a second end.

10. The cable assembly of claim 9, further including a pulling grip assembly disposed about the second connector.

11. A cable assembly, comprising:
    a cable having a subunit surrounded by an upjacketed portion;
        the subunit including at least one optical fiber and a plurality of tensile yarns disposed within a subunit jacket; and
        the upjacketed portion including strength components disposed about the subunit and within a jacket;
    a hardened fiber optic connector attached to the at least one optical fiber at a first end and strain-relieving at least some of the plurality of tensile yarns and the strength components, the hardened fiber optic connector includes a crimp body, wherein some of the plurality of tensile yarns of the subunit are attached to the crimp body and the strength components of the upjacketed portion are attached to the crimp body and the subunit jacket enters the crimp body.

12. The cable assembly of claim 11, the subunit jacket having at least one split within the crimp body.

13. The cable assembly of claim 11, wherein some of the plurality of tensile yarns being attached between the crimp body and a crimp band and the strength components are disposed between a first shell and a second shell of the crimp body.

14. The cable assembly of claim 11, further including a second connector attached to the at least one optical fiber at a second end.

15. The cable assembly of claim 14, further including a pulling grip assembly disposed about the second connector.

16. A cable assembly, comprising:
    a cable having a subunit surrounded by an upjacketed portion;
        the subunit including at least one optical fiber having a buffer layer with a diameter greater than 250 microns and a plurality of tensile yarns disposed within a subunit jacket; and
        the upjacketed portion including strength components disposed about the subunit and within a jacket;
    a hardened fiber optic connector attached to the at least one optical fiber at a first end and strain-relieving at least some of the plurality of tensile yarns and the strength components, the hardened fiber optic connector includes a crimp body and a connector assembly is held at the front of the crimp body and the strength components of the upjacketed portion are attached to the crimp body, wherein the buffer layer enters the crimp body and the connector assembly, and the subunit jacket enters the crimp body.

17. The cable assembly of claim 16, wherein the buffer layer enters a protective tube at least partially disposed within the crimp body.

18. The cable assembly of claim 16, further including a second connector attached to the at least one optical fiber at a second end.

19. The cable assembly of claim 18, further including a pulling grip assembly disposed about the second connector.

* * * * *